(12) United States Patent
Shimomura

(10) Patent No.: US 10,513,126 B2
(45) Date of Patent: Dec. 24, 2019

(54) IMAGE PROCESSING APPARATUS FOR INK JET PRINTER

(71) Applicant: RISO KAGAKU CORPORATION, Tokyo (JP)

(72) Inventor: Kenji Shimomura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/088,958

(22) PCT Filed: Feb. 14, 2017

(86) PCT No.: PCT/JP2017/005233
§ 371 (c)(1),
(2) Date: Sep. 27, 2018

(87) PCT Pub. No.: WO2017/169201
PCT Pub. Date: Oct. 5, 2017

(65) Prior Publication Data
US 2019/0118548 A1    Apr. 25, 2019

(30) Foreign Application Priority Data

Mar. 31, 2016  (JP) ................................ 2016-070371

(51) Int. Cl.
*B41J 2/21* (2006.01)
*H04N 1/405* (2006.01)
*H04N 1/40* (2006.01)

(52) U.S. Cl.
CPC ............ *B41J 2/2103* (2013.01); *H04N 1/405* (2013.01); *H04N 1/40062* (2013.01)

(58) Field of Classification Search
CPC ........ B41J 2/2103; B41J 2/525; B41J 2/2132; H04N 1/40062; H04N 1/405
See application file for complete search history.

(56) References Cited

U.S. PATENT DOCUMENTS 8,040,534 B2    10/2011  Yoneoka
8,919,907 B1 *  12/2014  Shimomura ........... B41J 2/2132
                                                       347/15

(Continued)

FOREIGN PATENT DOCUMENTS

JP    2007-142505 A    6/2007
JP    2013-063573 A    4/2013
JP    2014-148110 A    8/2014

OTHER PUBLICATIONS

International Search Report issued in International Bureau of WIPO Patent Application No. PCT/JP2017/005233, dated Apr. 4, 2017, along with an English translation thereof.

*Primary Examiner* — Sharon A. Polk
(74) *Attorney, Agent, or Firm* — Greenblum & Bernstein, P.L.C.

(57) ABSTRACT

A halftone processing of an image processing apparatus includes: performing a drop-less halftone processing on image data of each color corresponding to one or more ink colors including at least one selected from all ink colors of an inkjet printer in descending order of lightness of the all ink colors, the drop-less halftone processing having a minimum drop number per pixel greater than a minimum drop number per pixel in a normal halftone processing of generating drop data having a number of levels corresponding to a maximum drop number per pixel; and performing the normal halftone processing on image data of each color corresponding to the other ink colors other than the one or more ink colors.

7 Claims, 6 Drawing Sheets

(56) References Cited

U.S. PATENT DOCUMENTS

| | | | |
|---|---|---|---|
| 10,000,068 B2 * | 6/2018 | Fujiwara | B41J 2/2054 |
| 2015/0002568 A1 * | 1/2015 | Shimomura | B41J 2/2132 347/15 |

* cited by examiner

● : ONE DROP OF INK WITH LOW LIGHTNESS
(C, M, K)

◎ : ONE DROP OF INK WITH HIGH LIGHTNESS
(Y, Lc, Lm, Lk, LLk)

◉ : MULTIPLE DROPS OF INK WITH HIGH LIGHTNESS
(Y, Lc, Lm, Lk, LLk)

● : ONE DROP OF INK WITH LOW LIGHTNESS
(C, M, K)

◉ : MULTIPLE DROPS OF INK WITH HIGH LIGHTNESS
(Y, Lc, Lm, Lk, LLk)

● : MULTIPLE DROPS OF INK WITH LOW LIGHTNESS
(C, M, K)

○ : MULTIPLE DROPS OF INK WITH HIGH LIGHTNESS
(Y, Lc, Lm, Lk, LLk)

IMAGE PROCESSING APPARATUS FOR INK JET PRINTER

TECHNICAL FIELD

The present invention relates to an image processing apparatus which performs image processing for printing by an inkjet printer.

BACKGROUND ART

As one of printing methods, there is an inkjet method in which an image is formed by ejecting ink droplets from nozzles of an inkjet head to cause the ink droplets to land on a sheet.

Patent Literature 1 describes, among various inkjet methods, a multi-drop method in which multiple ink droplets can be ejected per pixel from one nozzle. In the multi-drop method, gradation printing is performed in which density is expressed depending on the number of ink droplets (drop number) ejected per pixel.

CITATION LIST

Patent Literature

Patent Literature 1: Japanese Patent Application Publication No. 2007-142505

SUMMARY OF INVENTION

If a sheet comes into contact with a nozzle surface of an inkjet head in an inkjet printer, the nozzle surface is sometimes damaged. If the nozzle surface is damaged, ink may not be ejected or may be ejected abnormally. Accordingly, measures to prevent the contact between the sheet and the nozzle surface are taken in the inkjet printer. As one of such measures, a head gap is adjusted depending on the thickness, type, and the like of the sheet. The head gap is the distance between the sheet and the nozzle surface. In the inkjet printer, the larger the head gap is, the more likely the deviation of ink landing positions and the generation of mist are to occur due to effects of air current and the like. These problems become more prominent as the size of the ink droplet becomes smaller.

In the multi-drop method, when multiple ink droplets are ejected per pixel, the ink droplets integrate with each other after the ejection and fly as one ink droplet. In other words, the size of the flying ink droplet is proportional to the number of the ink drops ejected per pixel (drop number). Accordingly, in the multi-drop method, the smaller the drop number of ink ejected per pixel is, the more likely the deviation of ink landing positions and the generation of mist are to occur.

When the head gap is large, the multi-drop method can reduce the deviation of ink landing positions and the generation of mist by performing so-called one-drop-less processing in which ejection of the minimum drop number per pixel, that is, only one drop, is avoided. This can suppress a decrease in print quality caused by the deviation of ink landing positions and reduce smears on a printed sheet and in a printing apparatus caused by ink mist.

When the aforementioned one-drop-less processing is performed, the minimum drop number per pixel actually increases. Accordingly, granularity decreases in gradation from a highlight region to an intermediate density portion of the printed image. The print quality of, for example, a photograph image thereby decreases.

An object of the present invention is to provide an image processing apparatus which can suppress a decrease in granularity of an image printed by an inkjet printer while reducing the deviation of ink landing positions and the generation of mist.

An image processing apparatus in accordance with some embodiments includes: a processor; and a memory including instructions that, when executed by the processor, cause the processor to perform operations. The operations include: performing a color conversion on input image data to generate image data of each color corresponding to each ink color of a multi-drop inkjet printer configured to eject ink of multiple colors; and performing a halftone processing on the generated image data of each color to generate drop data of each ink color indicating a drop number of ink to be ejected for each pixel in the inkjet printer. The halftone processing includes: performing a drop-less halftone processing on the image data of each color corresponding to one or more ink colors including at least one selected from all ink colors of the inkjet printer in descending order of lightness of the all ink colors, the drop-less halftone processing having a minimum drop number per pixel greater than a minimum drop number per pixel in a normal halftone processing of generating drop data having a number of levels corresponding to a maximum drop number per pixel; and performing the normal halftone processing on the image data of each color corresponding to the other ink colors other than the one or more ink colors.

In the aforementioned configuration, reducing the ink ejection of a small number of drops such as one drop per pixel for one or more ink colors can reduce deviation of ink landing positions and generation of mist. Moreover, performing the printing with the normal halftone processing performed for the other ink colors can suppress the decrease in granularity of the printed image. Accordingly, it is possible to suppress the decrease in granularity of the printed image while reducing the deviation of ink landing positions and the generation of mist.

The ink of the multiple colors may include: ink of four colors including cyan, magenta, yellow, and black; and ink of at least one light color having lightness higher than any of cyan, magenta, and black, the one or more ink colors maybe yellow and the at least one light color, and the other ink colors may be cyan, magenta, and black.

According to the aforementioned configuration, the one or more ink colors being the ink colors for which the drop-less halftone processing is performed are yellow and the light color. Meanwhile, the other ink colors being the ink colors for which the normal halftone processing is performed are cyan, magenta, and black. The drop-less halftone processing or the normal halftone processing is thus performed depending on the lightness of each of the ink colors of the inkjet printer which eject the inks of cyan, magenta, yellow, black, and the light color. Accordingly, it is possible to suppress the decrease in granularity of the printed image while reducing the deviation of ink landing positions and the generation of mist.

The operations may include determining the minimum drop number per pixel in the drop-less halftone processing, depending on lightness of the ink color corresponding to the image data to be processed.

According to the aforementioned configuration, it is possible to suppress the decrease in granularity of the printed image while reducing the deviation of ink landing positions and the generation of mist.

The operations may include determining the minimum drop number per pixel in the drop-less halftone processing, depending on a print condition in the inkjet printer.

According to the aforementioned configuration, setting the minimum drop number depending on the condition affecting the deviation of ink landing positions and the generation of mist can reduce the deviation of ink landing positions and the generation of mist.

The operations may include selectively performing, depending on a print condition in the inkjet printer: the normal halftone processing on the image data of all colors; or the drop-less halftone processing on the image data of each color corresponding to the one or more ink colors and the normal halftone processing on the image data of each color corresponding to the other ink colors.

According to the aforementioned configuration, performing the printing with the normal halftone processing performed for all colors depending on the print condition can further suppress the decrease in granularity of the printed image.

The print condition may include at least one of a head gap being a distance between a sheet on a conveyor belt of the inkjet printer and a nozzle surface of an inkjet head, a conveyance speed of the sheet by the conveyor belt, or an air volume of a fan generating sucking force at a belt hole of the conveyor belt by air suction to suck and hold the sheet on a conveyance surface of the conveyor belt.

DESCRIPTION OF EMBODIMENTS

Figure 1:
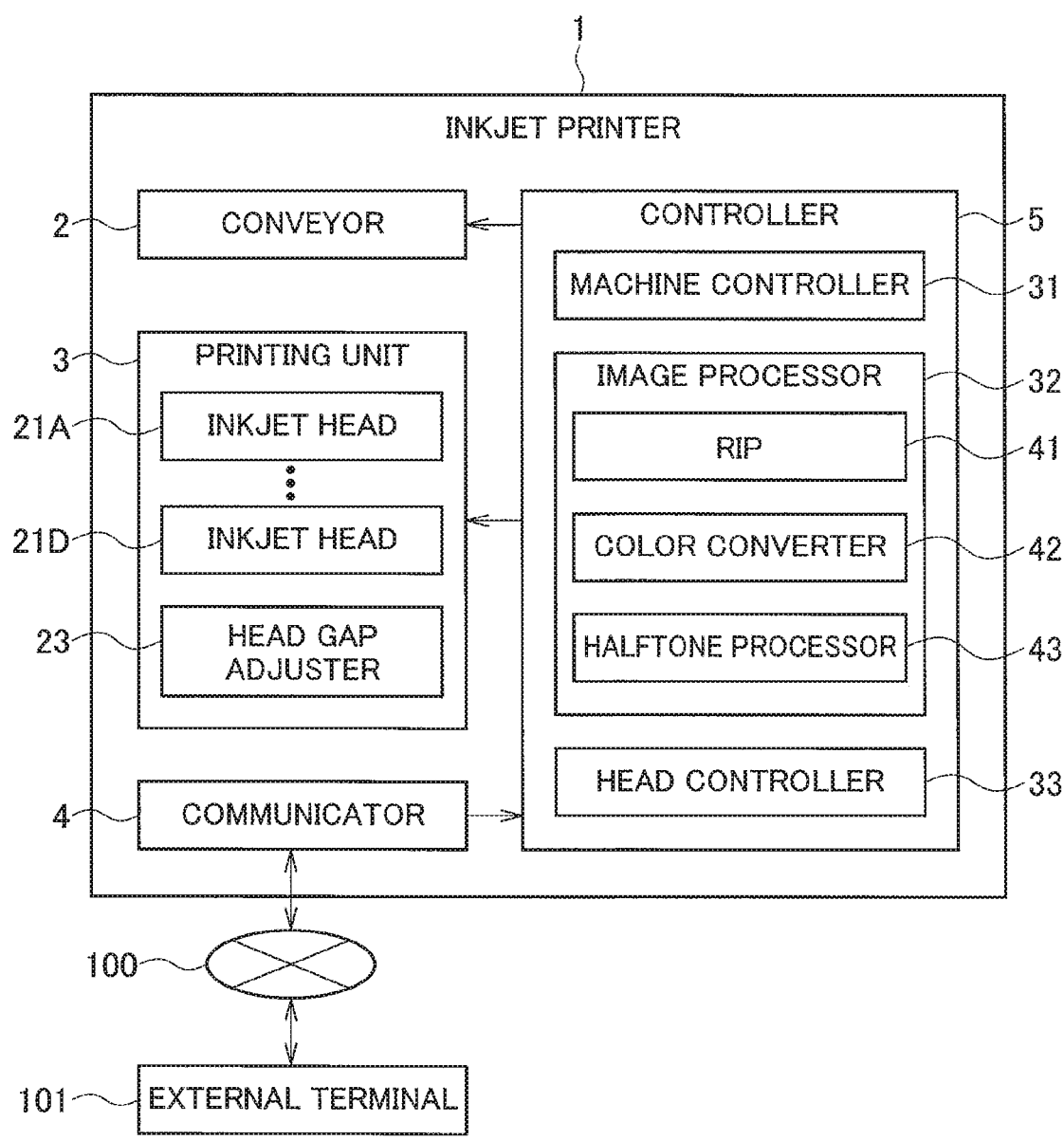
FIG. 1 is a block diagram illustrating a configuration of an inkjet printer according to an embodiment.

Embodiments of the present invention are described below with reference to the drawings. The same or similar parts and components in the drawings are denoted by the same or similar reference numerals.

The embodiments described below are examples of device and the like for embodying the technical idea of the present invention. The technical idea of the present invention does not specify the materials, shapes, structures, arrangements, and the like of the components to those described below. Various changes can be added to the technical idea of the present invention within the scope of claims.

Figure 2:
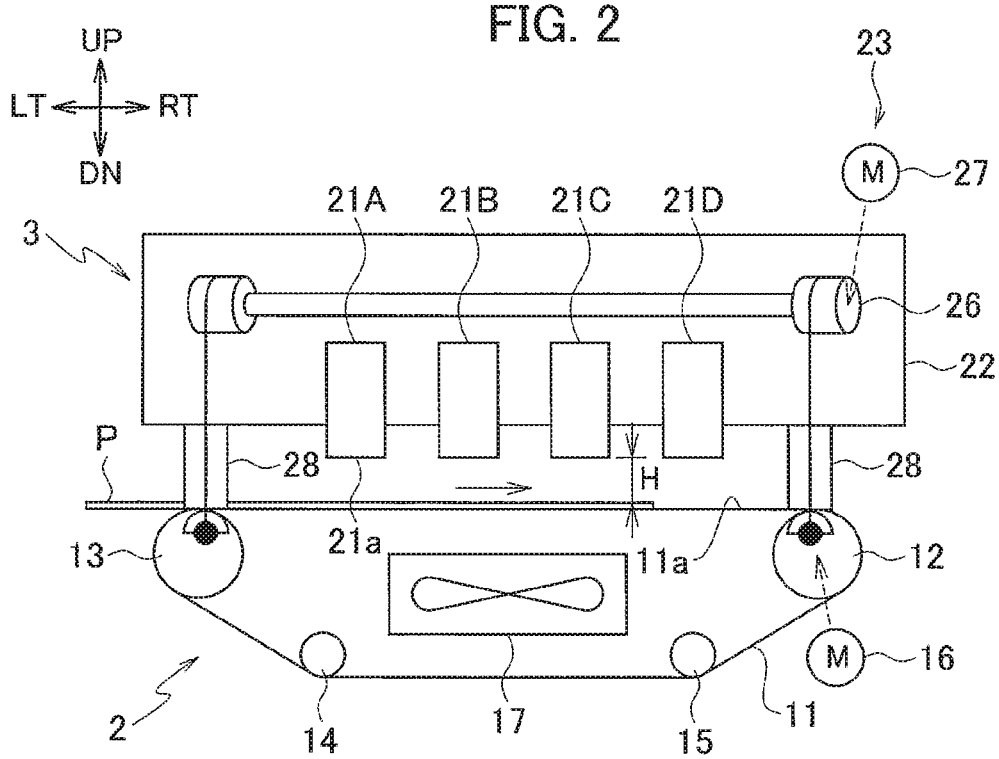
FIG. 2 is a schematic configuration diagram of a conveyor and a printing unit of the inkjet printer illustrated in FIG. 1.

FIG. 1 is a block diagram illustrating a configuration of an inkjet printer 1 in which an image processing apparatus according to an embodiment of the present invention is provided. FIG. 2 is a schematic configuration diagram of a conveyor 2 and a printing unit 3 in the inkjet printer 1 illustrated in FIG. 1. Note that, in FIG. 2, right, left, up, and down are denoted by RT, LT, UP, and DN, respectively. Moreover, the direction orthogonal to the sheet surface of FIG. 2 is referred to as a front-rear direction.

As illustrated in FIG. 1, the inkjet printer 1 includes the conveyor 2, the printing unit 3, a communicator 4, and a controller 5.

The conveyor 2 conveys a sheet P which is a print medium fed from a not-illustrated paper feeder. A direction from left to right in FIG. 2 is a conveyance direction of the sheet P. The conveyor 2 includes a conveyor belt 11, a drive roller 12, driven rollers 13 to 15, a conveyance motor 16, and a fan 17.

The conveyor belt 11 conveys the sheet P while sucking and holding the sheet P. The conveyor belt 11 is an annular belt wound around the drive roller 12 and the driven rollers 13 to 15. Multiple belt holes (not illustrated) which are through holes for sucking and holding the sheet P are formed in the conveyor belt 11. The conveyor belt 11 sucks and holds the sheet P on a conveyance surface (upper surface) 11a by using sucking force generated at the belt holes by means of air suction by the fan 17. The conveyor belt 11 is rotated clockwise in FIG. 2 to convey the sucked and held sheet P toward the right side.

The drive roller 12 rotates the conveyor belt 11 clockwise in FIG. 2.

The driven rollers 13 to 15 support the conveyor belt 11 together with the drive roller 12. The driven rollers 13 to 15 are driven by the drive roller 12 via the conveyor belt 11 to follow the drive roller 12. The driven roller 13 is arranged on the left side of the drive roller 12 at the same height as the drive roller 12. The driven rollers 14 and 15 are arranged below the drive roller 12 and the driven roller 13, at the same height while being spaced away from each other in a left-right direction.

The conveyance motor 16 rotationally drives the drive roller 12.

The fan 17 generates a downward air current. The fan 17 thereby sucks air through the belt holes of the conveyor belt 11 and generates negative pressure at the belt holes to suck the sheet P on the conveyance surface 11a of the conveyor belt 11. The fan 17 is arranged in a region surrounded by the conveyor belt 11.

The printing unit 3 prints an image on the sheet P conveyed by the conveyor 2. The printing unit 3 is arranged above the conveyor 2. The printing unit 3 includes inkjet heads 21A to 21D, a head holder 22, and a head gap adjuster 23. Note that, in the following description, the inkjet heads 21A to 21D are sometimes generally referred to by omitting the alphabets (A to D) attached the reference numerals.

Each of the inkjet heads 21 ejects an ink to the sheet P conveyed by the conveyor belt 11. The inkjet heads 21A to 21D are arranged to be aligned in a sub-scanning direction (left-right direction) which is the conveyance direction of the sheet P. The inkjet heads 21A to 21D each have two nozzle rows (not illustrated). Each nozzle row include multiple nozzles (not illustrated) arranged in a main scanning direction (front-rear direction) orthogonal to the sub-scanning direction. The nozzles are opened on a nozzle surface 21a which is a lower surface of the inkjet head 21 and eject the ink.

The inkjet heads 21 can eject inks of different colors from the nozzles, the colors of the inks ejected from the respective nozzle rows being different from one another. Specifically, inks of eight colors in total can be ejected from the inkjet heads 21A to 21D. In the embodiment, the inkjet heads 21A to 21D eject inks of cyan (C), magenta (M), yellow (Y), black (K), light cyan (Lc), light magenta (Lm), light black (Lk), and light light black (LLk).

Lc is a color obtained by increasing the lightness of C, and Lm is a color obtained by increasing the lightness of M. Lk is a color obtained by increasing the lightness of K, and LLk is a color obtained by increasing the lightness of Lk. The inks of four colors of Lc, Lm, Lk, and LLk are inks of light colors with higher lightness than any of the inks of three colors of C, M, and K.

The inkjet heads 21 are multi-drop inkjet heads which can eject multiple ink droplets from each nozzle per pixel, and performs gradation printing in which density is expressed depending on the number of ink droplets (drop number).

The head holder 22 holds the inkjet heads 21A to 21D. The head holder 22 is formed in a hollow rectangular solid shape. The head holder 22 is fixed at a predetermined location in a case (not illustrated) of the inkjet printer 1.

The head gap adjuster 23 adjusts a head gap H. The head gap H is a distance between the sheet P on the conveyor belt 11 and the nozzle surface 21a of each inkjet head 21. The head gap adjuster 23 includes a lifting-lowering mechanism 26, a lifting-lowering motor 27, and adjustment members 28.

The lifting-lowering mechanism 26 lifts and lowers the conveyor 2. The lifting-lowering mechanism 26 includes wires, pulleys, and the like and supports the conveyor 2 such that the conveyor 2 is suspended by the wires. The lifting-lowering mechanism 26 lifts and lowers the conveyor 2 by letting out and taking up the wires with the pulleys which are rotated by drive force of the lifting-lowering motor 27.

The lifting-lowering motor 27 supplies the lifting-lowering mechanism 26 with the drive force for letting out and taking up the wires.

The adjustment members 28 are members for adjusting the head gap H. The adjustment members 28 are provided to extend from four corners of a bottom surface of the head holder 22. The conveyor 2 is aligned by abutting on lower ends of the adjustment members 28. The adjustment members 28 are each configured such that the length thereof is adjustable.

The communicator 4 connects the inkjet printer 1 to a network 100. The inkjet printer 1 can thereby communicate with external apparatuses such as an external terminal 101. The network 100 is, for example, LAN (Local Area Network). The external terminal 101 is, for example, a personal computer.

The controller 5 controls operations of the entire inkjet printer 1. The controller 5 includes a machine controller 31, an image processor (image processing apparatus) 32, and a head controller 33. Units of the controller 5 can be implemented by software or hardware by using a CPU, a RAM, a ROM, a storage such as a hard disk drive and a semiconductor memory, and the like. The storage stores instructions that, when executed by a processor such as the CPU, cause the processor to perform processing described below.

The machine controller 31 controls the conveyor 2 to cause the conveyor 2 to convey the sheet P. Moreover, the machine controller 31 controls the head gap adjuster 23 to cause the head gap adjuster 23 to adjust the head gap H.

The image processor 32 processes print job data of a PDL format sent from the external terminal 101 and generates drop data for each of the colors (C, M, Y, K, Lc, Lm, Lk, and LLk) corresponding to the ink colors ejected by the inkjet heads 21A to 21D. The drop data of each color is data indicating the drop number of the ink per pixel for the color.

The image processor 32 includes a RIP (Raster Image Processor) 41, a color converter 42, and a halftone processor 43.

The RIP 41 performs RIP processing on the print job data to generate image data of R, G, and B. The image data of R, G, and B is, for example, 256 level data in which each pixel is expressed in 8 bits.

The color converter 42 performs color conversion on the image data of R, G, and B which is the image data received from the RIP 41 to generate image data of each of colors (C, M, Y, K, Lc, Lm, Lk, and LLk) corresponding to the ink colors ejected by the inkjet heads 21A to 21D. The image data of C, M, Y, K, Lc, Lm, Lk, and LLk is, for example, 256 level data in which each pixel is expressed in 8 bits. The color converter 42 converts the image data of R, G, and B to the image data of C, M, Y, K, Lc, Lm, Lk, and LLk by using a color profile prepared in advance.

The halftone processor 43 performs halftone processing on the image data of each color generated by the color converter 42 to generate droplet data for the corresponding ink color. Error diffusion processing or dither mask processing can be employed as the halftone processing.

The halftone processor 43 selectively performs a drop-less mode associated operation or a normal mode associated operation, depending on a print condition in the inkjet printer 1. An element for determining the print condition is, specifically, the head gap H. When the head gap H is equal to or greater than a predetermined head gap threshold, the halftone processor 43 performs the drop-less mode associated operation. Meanwhile, when the head gap H is less than the head gap threshold, the halftone processor 43 performs the normal mode associated operation.

The drop-less mode associated operation is an operation of generating the drop data of each color for performing printing in a drop-less mode. The drop-less mode is a mode in which printing is performed with the minimum drop number per pixel set to be greater than the minimum drop number per pixel in normal halftone processing, for one or more ink colors including at least one selected from all ink colors in the descending order of lightness. Specifically, the drop-less mode is a mode in which printing is performed with the minimum drop number per pixel set to be greater than the minimum drop number per pixel in the normal halftone processing, for Y, Lc, Lm, Lk, and LLk which are high-lightness ink colors whose lightness per dot is higher than a predetermined lightness threshold.

In the drop-less mode associated operation, the halftone processor 43 performs drop-less halftone processing on the image data of Y, Lc, Lm, Lk, and LLk, and performs the normal halftone processing on the image data of C, M, and K.

The normal halftone processing in the drop-less mode associated operation is processing in which drop data the number of levels of which corresponds to the maximum drop number per pixel is generated from the image data. For example, when the maximum drop number per pixel is seven drops, the drop data generated by the normal halftone processing is data in which eight levels are expressed by zero to seven drops.

The drop-less halftone processing is halftone processing in which the minimum drop number per pixel is increased from that in the normal halftone processing. Specifically, the drop-less halftone processing is halftone processing performed with the minimum drop number per pixel set to two drops or more. For example, when the maximum drop number per pixel is seven drops and the minimum drop number is two drops, the drop data generated by the drop-less halftone processing is data in which seven levels are expressed by zero drops and two to seven drops.

The normal mode associated operation is an operation of generating the drop data of each color for performing printing in a normal mode. The normal mode is a mode in which all ink colors in the inkjet printer 1 are printed in levels the number of which corresponds to the maximum drop number per pixel. In the normal mode associated operation, the halftone processor 43 performs the normal halftone processing on the image data of all colors (C, M, Y, K, Lc, Lm, Lk, and LLk).

The head controller 33 drives the inkjet heads 21A to 21D to cause them to eject the inks based on the drop data of the corresponding colors generated in the halftone processor 43.

Next, operations of the inkjet printer 1 are described.

When the inkjet printer 1 receives the print job data of the PDL format sent from the external terminal 101, the inkjet printer 1 performs the operation of generating the drop data based on the print job data in the image processor 32. This operation of the image processor 32 is described with reference to the flowchart of FIG. 3. The processing in the flowchart of FIG. 3 starts when the image processor 32 obtains the print job data received by the communicator 4 via the network 100.

Figure 3:
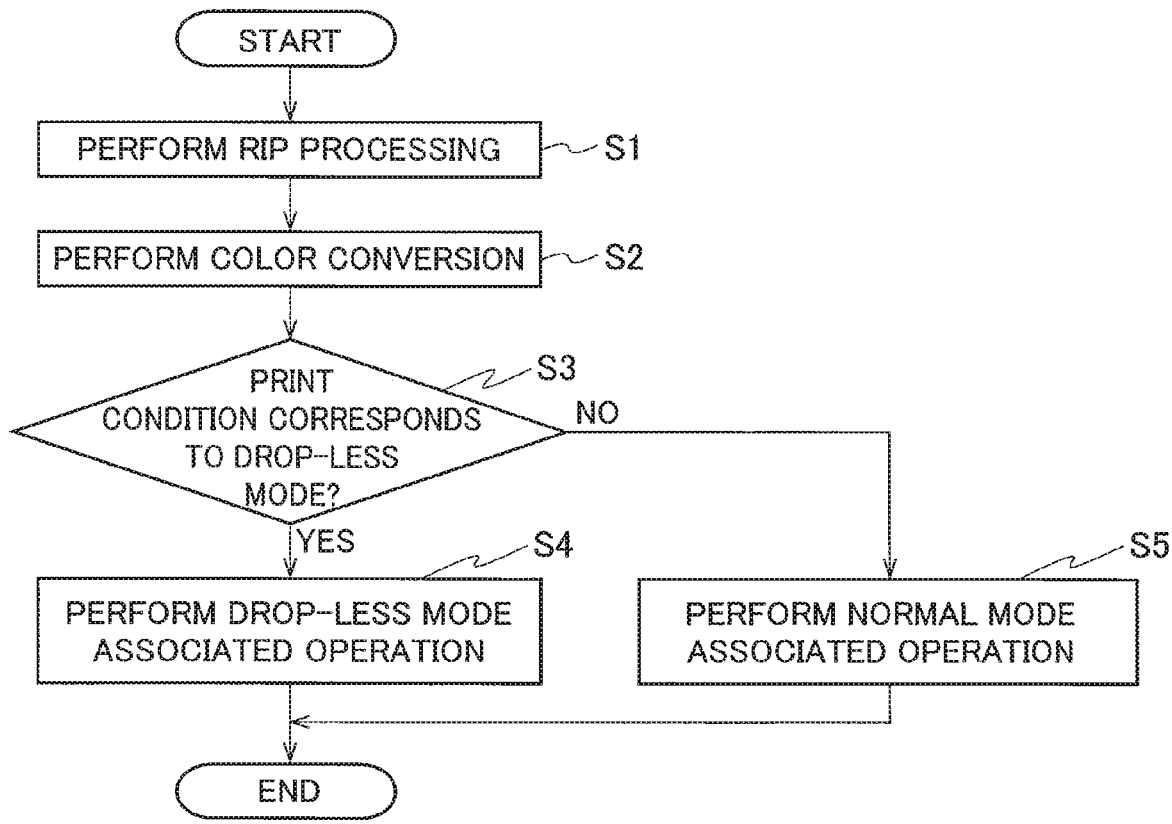
FIG. 3 is a flowchart for explaining operations of an image processor.

In step S1 of FIG. 3, the RIP 41 of the image processor 32 performs RIP processing on the print job data to generate the image data of R, G, and B.

Next, in step S2, the color converter 42 converts the image data of R, G, and B generated in the RIP 41 to the image data of C, M, Y, K, Lc, Lm, Lk, and LLk.

Then, in step S3, the halftone processor 43 determines whether the print condition in printing indicated by this print job data is the print condition corresponding to the drop-less mode. In the embodiment, the halftone processor 43 determines that the print condition is the print condition corresponding to the drop-less mode when the head gap H in the printing indicated by this print job data is equal to or greater than the head gap threshold.

In this case, the head gap H is determined depending on the sheet type. The halftone processor 43 obtains, from the RIP 41, sheet type information obtained by the RIP 41 in the RIP processing and determines whether the head gap H is equal to or greater than the head gap threshold based on the obtained sheet type.

When the print condition in the printing indicated by this print job data is determined to be the print condition corresponding to the drop-less mode (step S3: YES), in step S4, the halftone processor 43 performs the drop-less mode associated operation.

Specifically, the halftone processor 43 performs the normal halftone processing on the image data of C, M, and K which are ink colors with low lightness. The halftone processor 43 thereby generates, for example, data in which the drop number for each pixel is one of zero to seven drops, as the drop data of C, M, and K.

Moreover, the halftone processor 43 performs the drop-less halftone processing on the image data of Y, Lc, Lm, Lk, and LLk which are ink colors with high lightness.

In this case, the halftone processor 43 sets (determines) the minimum drop number per pixel in the drop-less halftone processing for the image data of each of Y, Lc, Lm, Lk, and LLk, depending on the lightness of the corresponding one of the ink colors of Y, Lc, Lm, Lk, and LLk. Specifically, the minimum drop number per pixel is increased for the ink color with high lightness because the higher the lightness of the ink color is, the less notable the decrease in granularity of the printed image is. For example, the minimum drop number for LLk with higher lightness than Y, Lc, Lm, and Lk is set to be greater than the minimum drop numbers for Y, Lc, Lm, and Lk.

Moreover, the halftone processor 43 sets (determines) the minimum drop number per pixel in the drop-less halftone processing, depending on the print condition in the printing indicated by this print job data. Specifically, the greater the head gap H in the printing indicated by this print job data is, the greater the minimum drop number per pixel is set by the halftone processor 43. The larger the head gap H is, the more likely the deviation of ink landing positions and the generation of mist are to occur. Moreover, the smaller the drop number per pixel is, the more likely the deviation of ink landing positions and the generation of mist are to occur. Accordingly, the greater the head gap H is, the greater the minimum drop number per pixel is set.

In the drop-less halftone processing, the drop data in which the minimum drop number is two or more is generated for each of the colors of Y, Lc, Lm, Lk, and LLk. For example, for a color for which the maximum drop number per pixel is set to seven drops and the minimum drop number is set to two drops, the drop data in which the drop number for each pixel is any of zero drops and two to seven drops is generated.

A specific example of processing performed when the halftone processor 43 performs the drop-less mode associated operation is described with reference to FIGS. 4A and 4B. As described above, in the drop-less mode associated operation, the halftone processor 43 performs the normal halftone processing on the image data of C, M, and K and performs the drop-less halftone processing on the image data of Y, Lc, Lm, Lk, and LLk.

Moreover, it is assumed that one-drop-less halftone processing is performed for Y, Lc, Lm, and Lk as the drop-less halftone processing. The one-drop-less halftone processing is halftone processing in which ejection of one drop per pixel is not used, that is the minimum drop number is set to two drops. Two-drop-less halftone processing is performed for LLk as the drop-less halftone processing. The two-drop-less halftone processing is halftone processing in which ejection of one drop per pixel and ejection of two drops per pixel are not used, that is the minimum drop number is set to three drops.

Figure 4A:
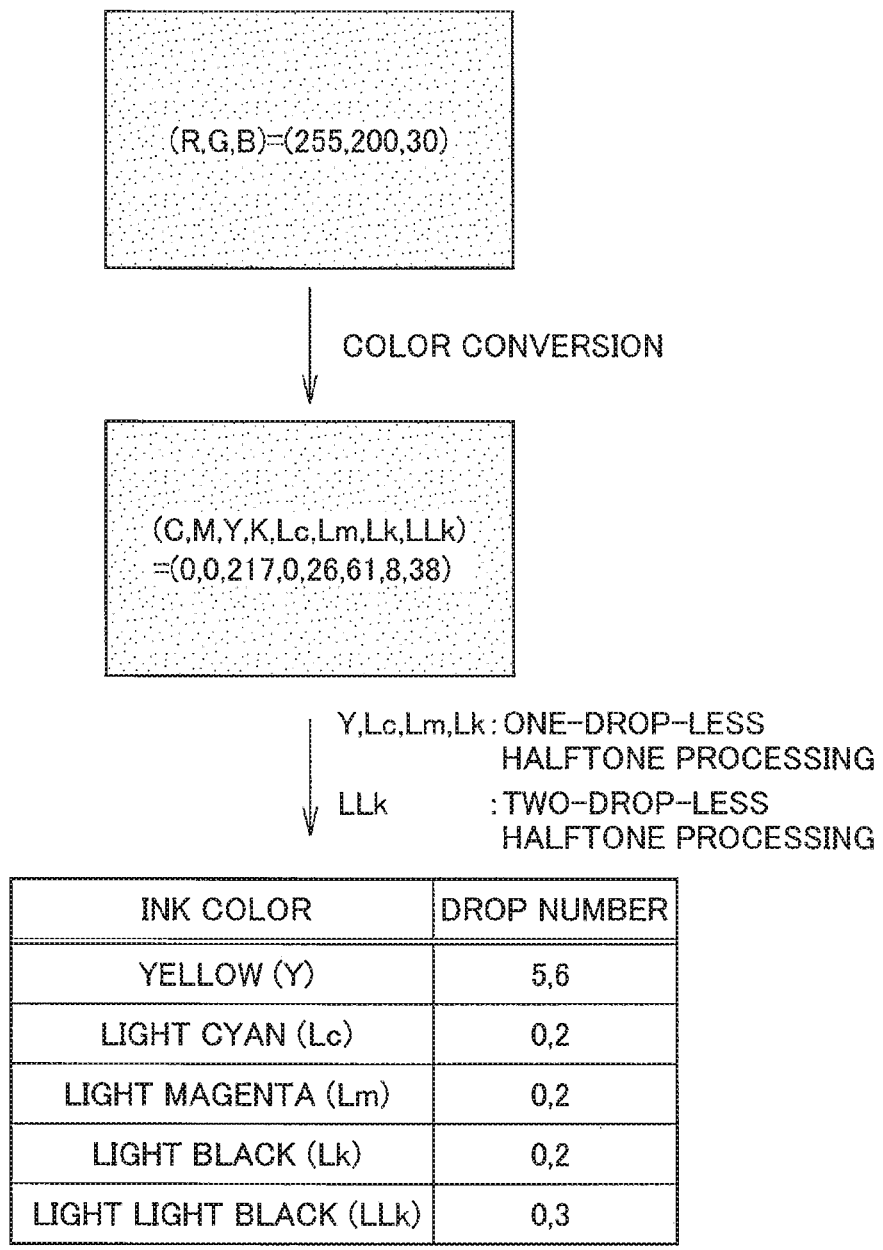
FIG. 4A is an explanatory diagram of an example of processing in a drop-less mode associated operation of a halftone processor.

In the example of FIG. 4A, an image region in which each pixel is expressed as (R, G, B)=(255, 200, 30) is color-converted to obtain image data in which each pixel is expressed as (C, M, Y, K, Lc, Lm, Lk, LLk)=(0, 0, 217, 0, 26, 61, 8, 38). Since the pixel values of C, M, and K are 0 in this example, no halftone processing is performed for C, M, and K. The one-drop-less halftone processing is performed for Y, Lc, Lm, and Lk, and the two-drop-less halftone processing is performed for LLk. As illustrated in a lower portion of FIG. 4A, the following results are thereby obtained: the drop number per pixel is five or six drops for Y; the drop number per pixel is zero or two drops for Lc, Lm, and Lk; and the drop number per pixel is zero or three drops for LLk.

Figure 4B:
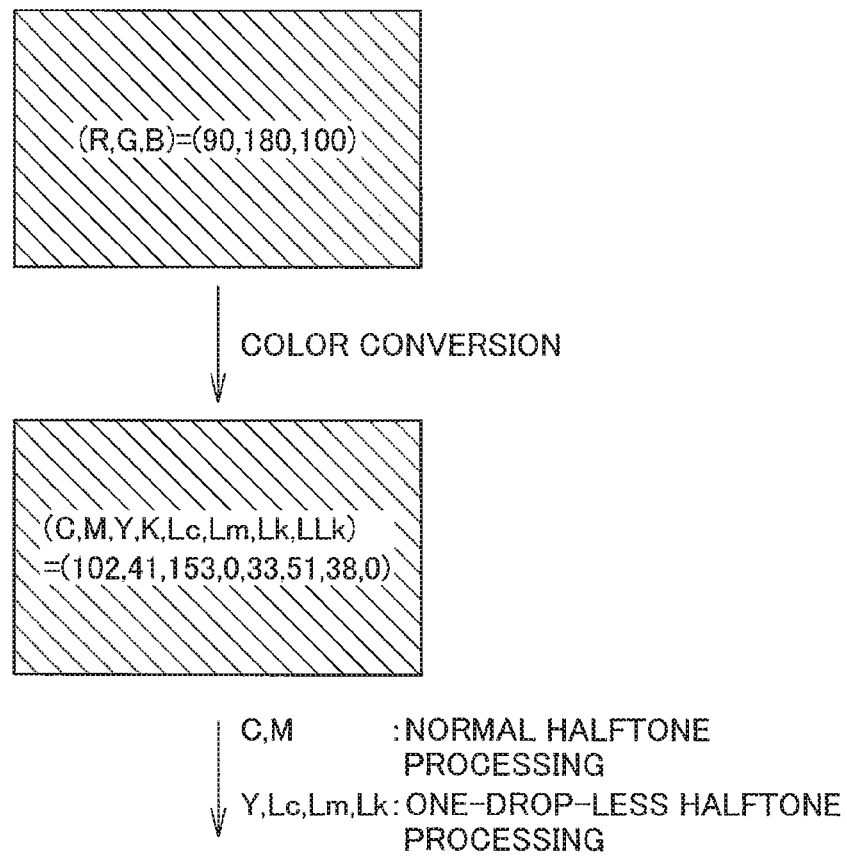
FIG. 4B is an explanatory diagram of another example of processing in the drop-less mode associated operation of the halftone processor.

In the example of FIG. 4B, an image region in which each pixel is expressed as (R, G, B)=(90, 180, 100) is color-converted to obtain image data in which each pixel is expressed as (C, M, Y, K, Lc, Lm, Lk, LLk)=(102, 41, 153, 0, 33, 51, 38, 0). Since the pixel values of K and LLk are 0 in this example, no halftone processing is performed for K and LLk. The normal halftone processing is performed for C and M and the one-drop-less halftone processing is performed for Y, Lc, Lm, and Lk. As illustrated in a lower portion of FIG. 4B, the following results are thereby obtained: the drop number per pixel is two or three drops for C; the drop number per pixel is one or two drops for M; the drop number per pixel is four or five drops for Y; and the drop number per pixel is zero or two drops for Lc, Lm, and Lk.

Returning to FIG. 3, in step S3, when the print condition in the printing indicated by this print job data is determined not to be the print condition corresponding to the drop-less mode (step S3: NO), in step S5, the halftone processor 43 performs the normal mode associated operation. Specifically, the halftone processor 43 performs the normal halftone processing on the image data of all colors (C, M, Y, K, Lc, Lm, Lk, and LLk). The halftone processor 43 thereby generates, for example, data in which the drop number for each pixel is one of zero to seven drops, as the drop data of each color.

When the drop data is generated in step S4 or S5, the series of operations by the image processor 32 is completed.

After the image processor 32 generates the drop data of each color, the head controller 33 drives the inkjet heads 21A to 21D based on the generated drop data and causes the inkjet heads 21A to 21D to eject the inks to the sheet P conveyed by the conveyor 2.

Before the start of sheet conveyance, the machine controller 31 adjusts the head gap H by using the head gap adjuster 23. The machine controller 31 obtains, from the RIP 41, the sheet type information obtained by the RIP 41 in the RIP processing and controls the head gap adjuster 23 such that the head gap H is adjusted to a size corresponding to the sheet type.

After the adjustment of the head gap H is completed, the machine controller 31 starts the drive of the conveyor 2. Specifically, the machine controller 31 starts the drive of the drive roller 12 and the fan 17.

Thereafter, when the sheet P is fed from the not-illustrated paper feeder to the conveyor 2, the sheet P is conveyed while being sucked and held on the conveyance surface 11a. The inks are ejected from the inkjet heads 21A to 21D to the conveyed sheet P and an image is thereby printed. The printing is performed in the normal mode or the drop-less mode, depending on the size of the head gap H.

Figure 5A:
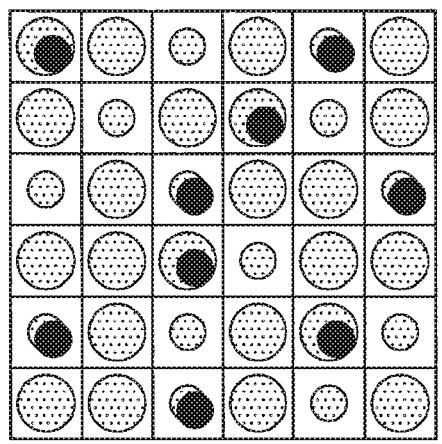
FIG. 5A is a view illustrating an example of a dot image of an image printed in the normal mode.
Figure 5B:
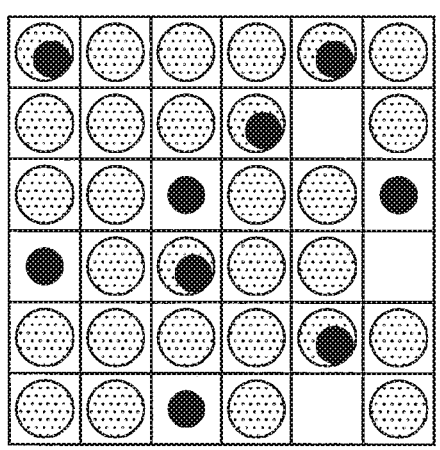
FIG. 5B is a view illustrating an example of a dot image of an image printed in the drop-less mode.
Figure 5C:
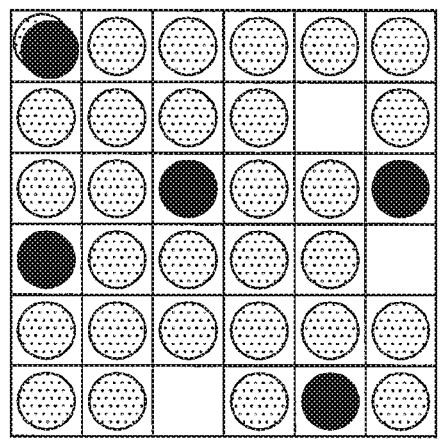
FIG. 5C is a view illustrating a dot image of the printed image according to a comparative example in the case where printing is performed with one-drop-less halftone processing performed for all colors.

Examples of dot images of printed images in the normal mode and the drop-less mode are illustrated in FIGS. 5A and 5B, respectively. In FIGS. 5A to 5C, small dots each indicate a dot formed by one drop of ink and large dots each indicate a dot formed by multiple drops of ink. Moreover, black solid dots each indicate a dot formed by the ink of one of C, M, and K which are the ink colors with low lightness. Dots shaded by dots each indicate a dot formed by the ink of one of Y, Lc, Lm, Lk, and LLk which are the ink colors with high lightness.

As illustrated in FIG. 5B, in the drop-less mode, unlike in the normal mode in FIG. 5A, no ejection of one drop per pixel is performed for the ink colors with high lightness. Accordingly, the deviation in ink landing positions and the generation of mist can be reduced.

Meanwhile, in the drop-less mode, since no ejection of one drop per pixel is performed for the ink colors with high lightness, the density of dots decreases and the granularity of the ink colors with high lightness thereby decreases from that in the normal mode in FIG. 5A. However, since the dots of the ink colors with high lightness are less visible, the decrease in granularity is less noticeable. For the ink colors with low lightness which are highly visible, dots formed by one drop are present in the drop-less mode as in the normal mode in FIG. 5A and the granularity is thus maintained. Accordingly, the decrease in granularity of the image as a whole is suppressed in the drop-less mode.

A dot image of a printed image in the case where printing is performed with the one-drop-less halftone processing performed for all colors is illustrated in FIG. 5C as a comparative example.

In this case, since there is no ejection of one drop per pixel also for the ink colors with low lightness, the deviation of ink landing positions and the generation of mist can be reduced compared to those in the drop-less mode in FIG. 5B. However, since the density of the dots of the ink colors with low lightness which are highly visible is lower than those in the normal mode in FIG. 5A and the drop-less mode in FIG. 5B, the granularity of the image as a whole greatly decreases.

Accordingly, in the drop-less mode in the embodiment, it is possible to suppress the decrease in granularity of the printed image compared to the case where one-drop-less printing is performed for all colors as in the comparative example of FIG. 5C while reducing the deviation of ink landing positions and the generation of mist compared to the printing in the normal mode.

As described above, in the inkjet printer 1, the halftone processor 43 performs the drop-less halftone processing on the image data of colors corresponding to the one or more ink colors which include at least one selected from all ink colors in the descending order of lightness, in the drop-less mode. The halftone processor 43 performs the normal halftone processing on the image data of colors corresponding to the other ink colors which are ink colors other than the one or more ink colors. Reducing the ink ejection of a small number of drops such as one drop per pixel for the one or more ink colors can reduce the deviation of ink landing positions and the generation of mist. Moreover, performing the printing with the normal halftone processing performed for the other ink colors can suppress the decrease in granularity of the printed image. Accordingly, the inkjet printer 1 can suppress the decrease in granularity of the printed image while reducing the deviation of ink landing positions and the generation of mist.

Specifically, the halftone processor 43 performs the drop-less halftone processing on the image data of Y and the light colors (Lc, Lm, Lk, and LLk) and performs the normal halftone processing on the image data of C, M, and K, in the drop-less mode. The halftone processor 43 thus performs the drop-less halftone processing or the normal halftone processing for each of the ink colors of the inkjet printer 1, depending on the lightness of the ink color and can suppress the decrease in granularity of the printed image while reducing the deviation of ink landing positions and the generation of mist.

Moreover, the halftone processor 43 sets the minimum drop number per pixel in the drop-less halftone processing depending on the lightness of the ink color corresponding to the image data to be processed. Specifically, the higher the lightness of the ink color is, the greater the minimum drop number per pixel is set by the halftone processor 43. This can suppress the decrease in granularity of the printed image while reducing the deviation of ink landing positions and the generation of mist.

Furthermore, the halftone processor 43 sets the minimum drop number per pixel in the drop-less halftone processing depending on the print condition. Specifically, the halftone processor 43 sets the minimum drop number per pixel in the drop-less halftone processing depending on the size of the head gap H. Setting the minimum drop number depending on the condition which affects the deviation of ink landing positions and the generation of mist can further reduce the deviation of ink landing positions and the generation of mist.

Moreover, the halftone processor 43 selectively performs the normal mode associated operation and the drop-less mode associated operation depending on the print condition. Specifically, the halftone processor 43 selects the normal mode associated operation or the drop-less mode associated operation depending on the size of the head gap H. Performing the printing with the normal halftone processing performed for all colors depending on the print condition can further suppress the decrease in granularity of the printed image.

Note that, although the ink colors ejected by the inkjet printer 1 are C, M, Y, K, Lc, Lm, Lk, and LLk in the aforementioned embodiment, the combination of ink colors is not limited to this. For example, the combination of ink colors may be a combination in which at least one of Lc, Lm, Lk, and LLk which are light color inks is omitted. The inkjet printer may be any printer which ejects inks of multiple colors.

Moreover, although the element for determining the print condition is the head gap H in the aforementioned embodiment, the element is not limited to this. For example, the higher the sheet conveyance speed by the conveyor 2 (conveyor belt 11) is, the stronger the air current generated by the sheet conveyance is and the deviation of ink landing positions and the generation of mist are more likely to occur. Accordingly, the sheet conveyance speed may be used as the element for determining the print condition. Moreover, the greater the air volume of the fan 17 is, the greater the suction air volume at the belt holes is and the deviation of ink landing positions and the generation of mist are more likely to occur. Accordingly, the air volume of the fan 17 may be used as the element for determining the print condition. Furthermore, multiple elements may be used in combination to determine the print condition.

Moreover, as described above, the higher the sheet conveyance speed is, the more likely the deviation of ink landing positions and the generation of mist are to occur. Accordingly, the minimum drop number per pixel maybe increased in the drop-less halftone processing. Furthermore, as described above, the greater the air volume of the fan 17 is, the more likely the deviation of ink landing positions and the generation of mist are to occur. Accordingly, the minimum drop number per pixel in the drop-less halftone processing may be increased.

Moreover, although the halftone processor 43 selects the normal mode associated operation or the drop-less mode associated operation depending on the print condition in the aforementioned embodiment, the halftone processor 43 may perform the selection depending on an instruction by the user. Furthermore, the printing in the normal mode and the normal mode associated operation of the halftone processor 43 for the printing in the normal mode may be omitted.

The present invention is not limited to the aforementioned embodiment as it is, and the constitutional elements can be modified and embodied within a scope not departing from the spirit of the invention in a stage of carrying out the invention. Moreover, various inventions can be made by appropriately combining the constitutional elements disclosed in the aforementioned embodiment. For example, some of the constitutional elements described in the embodiment may be omitted.

The entire contents of Japanese Patent Application No. 2016-070371 (filed on Mar. 31, 2016) are incorporated herein by reference.

The invention claimed is:

1. An image processing apparatus comprising:
a processor; and
a memory including instructions that, when executed by the processor, cause the processor to perform operations including:
performing a color conversion on input image data to generate image data of each color corresponding to each ink color of a multi-drop inkjet printer configured to eject ink of multiple colors; and
performing a halftone processing on the generated image data of each color to generate drop data of each ink color indicating a drop number of ink to be ejected for each pixel in the inkjet printer,
wherein the halftone processing includes
performing a drop-less halftone processing on the image data of each color corresponding to one or more ink colors including at least one selected from all ink colors of the inkjet printer in descending order of lightness of the all ink colors, the drop-less halftone processing having a minimum drop number per pixel greater than a minimum drop number per pixel in a normal halftone processing of generating drop data having a number of levels corresponding to a maximum drop number per pixel, and
performing the normal halftone processing on the image data of each color corresponding to the other ink colors other than the one or more ink colors.

2. The image processing apparatus according to claim 1, wherein
the ink of the multiple colors include
ink of four colors including cyan, magenta, yellow, and black, and
ink of at least one light color having lightness higher than any of cyan, magenta, and black,
the one or more ink colors are yellow and the at least one light color, and
the other ink colors are cyan, magenta, and black.

3. The image processing apparatus according to claim 1, wherein the operations include determining the minimum drop number per pixel in the drop-less halftone processing, depending on lightness of the ink color corresponding to the image data to be processed.

4. The image processing apparatus according to claim 1, wherein the operations include determining the minimum drop number per pixel in the drop-less halftone processing, depending on a print condition in the inkjet printer.

5. The image processing apparatus according to claim 1, wherein the operations include selectively performing, depending on a print condition in the inkjet printer:
the normal halftone processing on the image data of all colors; or
the drop-less halftone processing on the image data of each color corresponding to the one or more ink colors and the normal halftone processing on the image data of each color corresponding to the other ink colors.

6. The image processing apparatus according to claim 4, wherein the operations include selectively performing, depending on the print condition:
the normal halftone processing on the image data of all colors; or
the drop-less halftone processing on the image data of each color corresponding to the one or more ink colors and the normal halftone processing on the image data of each color corresponding to the other ink colors.

7. The image processing apparatus according to claim 1, wherein the print condition includes at least one of a head gap being a distance between a sheet on a conveyor belt of the inkjet printer and a nozzle surface of an inkjet head, a conveyance speed of the sheet by the conveyor belt, or an air volume of a fan generating sucking force at a belt hole of the conveyor belt by air suction to suck and hold the sheet on a conveyance surface of the conveyor belt.

* * * * *